United States Patent Office 2,945,070
Patented July 12, 1960

2,945,070
STABILIZATION OF CHLORINATED HYDROCARBONS

Fred W. Starks, Kenmore, N.Y., assignor to E. I. du Pont de Nemours and Company, Wilmington, Del., a corporation of Delaware No Drawing. Filed Jan. 23, 1958, Ser. No. 710,619

2 Claims. (Cl. 260—652.5)

This invention relates to chlorinated hydrocarbons stabilized by the addition thereto of small amounts of certain chemicals. It relates particularly to trichlorethylene and perchlorethylene.

The removal of grease films from metallic surfaces has been practiced for many years. Generally, the removal is accomplished by suspending the metal to be degreased in a boiling fat-solvent at atmospheric pressure. Suitable fat-solvents including particularly the chlorinated hydrocarbons, of which trichlorethylene, perchlorethylene, tetrachlorethane and ethylene chloride are representative, but others may be utilized as well.

Trichlorethylene is probably the solvent most widely used in such operations. It is, however, seldom used in the pure state. Instead, stabilizing agents are usually added to prevent decomposition under the conditions of storage and utility. Light and oxygen, for example, decompose trichlorethylene very rapidly. Heat is also deleterious to this solvent and may accelerate the effects of light and oxygen. Unless precautions are taken, decomposition from heat, light and oxygen takes place under ordinary conditions. This type of decomposition may, therefore, be called "normal." Many compounds are known which, in trace amounts, will inhibit normal decomposition.

Another type of decomposition occurs when the workpiece to be degreased is made of aluminum or an aluminum alloy. The stabilizers effective to prevent decomposition by oxygen, light or heat are, in general, powerless against decomposition caused by aluminum. Resultant solvent degradation is made manifest by a rapid increase in acidity, discoloration of the solvent media and formation of black oils and tar. The same type of decomposition is also noted but in smaller degree in iron degreasing.

The causes of this metal induced decomposition are not exactly known. However, it is evident that whatever the mechanism, its initiation probably involves the production of hydrogen chloride. Hydrogen chloride may result from air oxidation of the chlorinated hydrocarbon, the decomposition of the chlorinated cutting oils frequently removed from metallic workpieces by degreasing or the catalytic effect of metal surfaces on these chlorinated compounds. This hydrogen chloride then reacts with the metal surface forming halide salts. When metallic aluminum or an aluminum alloy is being degreased, aluminum chloride is formed and this salt is an extremely active catalyst for the decomposition of chlorinated solvents, such as trichlorethylene and perchlorethylene. Solvent degradation is evidenced by a rapid rise in temperature and pronounced discoloration. In advanced stages, there is formed a black, tarry mass which may deposit on the workpiece. The same phenomenon may also be observed in iron degreasing where ferric chloride is a decomposition catalyst, but to a much lesser extent. In any event, it has heretofore been necessary to shut down operations and to remove non-volatiles and metal fines at frequent intervals. Such shutdowns entail additional labor, loss of production and loss of solvent. Hence, this metal induced decomposition detracts from the economics of the degreasing process.

A major object of this invention, is therefore, provision of a novel and useful method of stabilizing chlorinated hydrocarbons, particularly trichlorethylene and perchlorethylene.

Another object is provision of a method for stabilizing chlorinated hydrocarbons against decomposition induced by metals, aluminum in particular.

An additional object is provision of a chlorinated hydrocarbon stabilized against decomposition induced by aluminum.

The above-mentioned and still further objects may be accomplished by dissolving a small amount of an organic acyclic sulfone in trichlorethylene or perchlorethylene. The said acyclic sulfones are to be differentiated from the cyclic sulfones whose utility as stabilizers against metal and metallic salt induced decomposition of chlorinated hydrocarbons is covered by the present inventor's U.S. Patent 2,742,509 (April 17, 1956), which is of similar assignment.

The sulfones of this invention are compounds possessing the type formula, $R.SO_2.R'$, in which R and R' represent aliphatic, araliphatic or aromatic hydrocarbon radicals which may be the same or different. The hydrocarbon radicals represented by R and R' may also carry substantially inert substituents, such as hydroxyl groups, alkoxy groups, halogen atoms, etc., which do not react with or decompose halogenated degreasing solvents or corrode metals. These radicals may also carry sulfone substituents so that the stabilizer is an acyclic polysulfone. Stabilizers of the type suitable for use in this invention include: dimethyl sulfone, diethyl sulfone, di-n-propyl sulfone, di-n-butyl sulfone, phenyl ethyl sulfone, diphenyl sulfone, methylene bis-methyl sulfone $$(CH_3SO_2CH_2SO_2CH_3)$$

and sulfonal $((CH_3)_2C(SO_2C_2H_5)_2)$.

The quantity of sulfone required for effective stabilization of the chlorinated hydrocarbons is not very great, but will vary to some extent with the individual compound. In general between about 0.1% and 5% by weight of the additive is effective. However, some stabilization takes place even when much lower concentrations of the additive are dissolved in the chlorinated hydrocarbon. The acyclic sulfones are compatible with the stabilizing agents normally present in chlorinated hydrocarbons. Consequently, these sulfones are readily employed in combination with the stabilizers that inhibit normal decomposition.

There follow some examples which illustrate details of the invention. In these examples, the presence of aluminum chloride simulates stringent operating conditions in a metal degreaser. Stabilizers, which make it possible to reflux a trichlorethylene sample for several hours are definitely effective since under these extreme conditions the unprotected solvent is almost completely decomposed by the time it reaches the reflux temperature. All pressures are those of the ambient atmosphere and all concentrations are in percent by weight.

Example 1

This example shows the decomposition of trichlorethylene in the absence of the stabilizers of this invention on exposure to aluminum chloride. The trichlorethylene employed in this and subsequent examples contained small concentrations of p-tertiary aryl phenol and triethylamine. The phenol derivative is commonly employed to prevent normal decomposition whereas the latter neutralizes small quantities of hydrogen chloride which may be formed. A 100 ml. sample of this stabilized trichlorethylene and 0.5 g. of anhydrous aluminum chloride were placed in a flask equipped with a reflux condenser and heated to boiling. Decomposition was extremely rapid and the sample was black, opaque and contained a large amount of black precipitate by the time it reached reflux temperature. It was then flooded with water to arrest the exothermic decomposition reaction.

Example 2

A 100 ml. sample of the trichlorethylene stock employed in Example 1 was additionally stabilized by the addition of 0.5% of di-n-butyl sulfone giving a colorless solution. This solution and 0.5 g. anhydrous aluminum chloride were then placed in flask equipped with a reflux condenser and boiled for seventy-one hours. When the refluxing commenced the material developed a light brown color and evolved some hydrogen chloride for about two minutes. On further refluxing a slight darkening in color became evident. When the refluxing had been completed, the sample was cloudy and brown in color and contained a small amount of black sediment.

Example 3

A 100 ml. of the trichlorethylene stock employed in the previous examples in which 0.5% of diphenyl sulfone had been dissolved was placed in a flask with 0.5 g. aluminum chloride. The flask was equipped with a reflux condenser and the contents were refluxed for 71.5 hours. The boiling material developed a light brown color and a small quantity of hydrogen chloride was briefly emitted. On further heating, the sample darkened and was cloudy when the reflux period was complete. A small amount of black sediment was also noted.

It should be noted that numerous variations are possible without departing from the spirit of this invention. Perchlorethylene may be employed in place of trichlorethylene as previously pointed out. This solvent is more stable with respect to aluminum chloride catalyzed decomposition and, consequently, requires less acyclic sulfone for protection. A wide variety of acyclic sulfones can be used as stabilizers provided they are soluble in the chlorinated solvent. The acyclic sulfone stabilizers can also be used in combination with the various other stabilizers used to protect chlorinated solvents against normal decomposition as well as the various acid acceptors such as triethylamine, pyridine and other antacids.

Having described my invention, I claim:

1. The method of stabilizing a chlorinated hydrocarbon selected from the group of trichlorethylene and perchlorethylene which comprises supplying thereto 0.1 to 5% of di-n-butyl sulfone to stabilize said hydrocarbon against decomposition induced by metals and metallic salts.

2. A stabilized chlorinated hydrocarbon of the group consisting of trichlorethylene and perchlorethylene containing dissolved therein 0.1 to 5% of di-n-butyl sulfone.

References Cited in the file of this patent

UNITED STATES PATENTS 2,742,509     Starks                 July 23, 1954